(12) United States Patent
Thiel

(10) Patent No.: US 8,366,198 B2
(45) Date of Patent: Feb. 5, 2013

(54) FITTING FOR A VEHICLE SEAT

(75) Inventor: Peter Thiel, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 282 days.

(21) Appl. No.: 12/811,123

(22) PCT Filed: Apr. 28, 2009

(86) PCT No.: PCT/EP2009/003062
§ 371 (c)(1),
(2), (4) Date: Jun. 29, 2010

(87) PCT Pub. No.: WO2009/152892
PCT Pub. Date: Dec. 23, 2009

(65) Prior Publication Data
US 2010/0283304 A1    Nov. 11, 2010

(30) Foreign Application Priority Data

Jun. 16, 2008  (DE) .......................... 10 2008 029 438

(51) Int. Cl.
*B60N 2/02* (2006.01)
(52) U.S. Cl. ................. 297/374; 297/354.1; 297/354.12
(58) Field of Classification Search ............... 297/354.1, 297/354.12, 363, 374, 378.1, 378.11, 378.12
See application file for complete search history.

(56) References Cited

U.S. PATENT DOCUMENTS

| 4,997,223 | A * | 3/1991 | Croft ......................... 297/367 R |
| 7,306,286 | B2 * | 12/2007 | Syrowik et al. .......... 297/378.12 |
| 7,819,479 | B2 * | 10/2010 | Halbig et al. ............. 297/378.14 |
| 2005/0253439 | A1 * | 11/2005 | Sasaki et al. ................ 297/378.1 |
| 2006/0012232 | A1 | 1/2006 | Coughlin et al. |
| 2006/0284471 | A1 * | 12/2006 | Assmann et al. .......... 297/463.1 |
| 2007/0170764 | A1 * | 7/2007 | Thiel et al. ..................... 297/367 |
| 2010/0171351 | A1 * | 7/2010 | Thiel et al. ..................... 297/341 |

FOREIGN PATENT DOCUMENTS

| DE | 20 2006 013 783 U1 | 5/2007 |
| DE | 102006044489 | 8/2007 |
| FR | 2 799 420 | 4/2001 |

* cited by examiner

*Primary Examiner* — Peter Brown
*Assistant Examiner* — Philip Gabler
(74) *Attorney, Agent, or Firm* — McGlew and Tuttle, P.C.

(57) ABSTRACT

A fitting (5) for a vehicle seat, particularly for a motor vehicle seat, is provided with a first fitting part (9) fixed to a seat part, a second fitting part (11) that can be rotated between a plurality of usage positions relative to the first fitting part (9) for setting the tilt of the back (2) of the vehicle seat (1) and a locking element (15) fixedly connected particularly to the second fitting part (11). A third fitting part (14) is fixed to the back that can be locked by the locking element (15) and may be pivoted about an axis (A) relative to the second fitting part (11) for centered free pivoting of the back (2). A stop (18, 19) limits the pivot motion of the third fitting part (14) on one side. The stop includes at least one axially protruding first stop cam (18) that is formed on the third fitting part (14) and at least one axially protruding second stop cam (19) that is formed on the locking element (15). The cams limit the pivot motion of the third fitting part (14) by working together as the stop (18, 19).

19 Claims, 4 Drawing Sheets

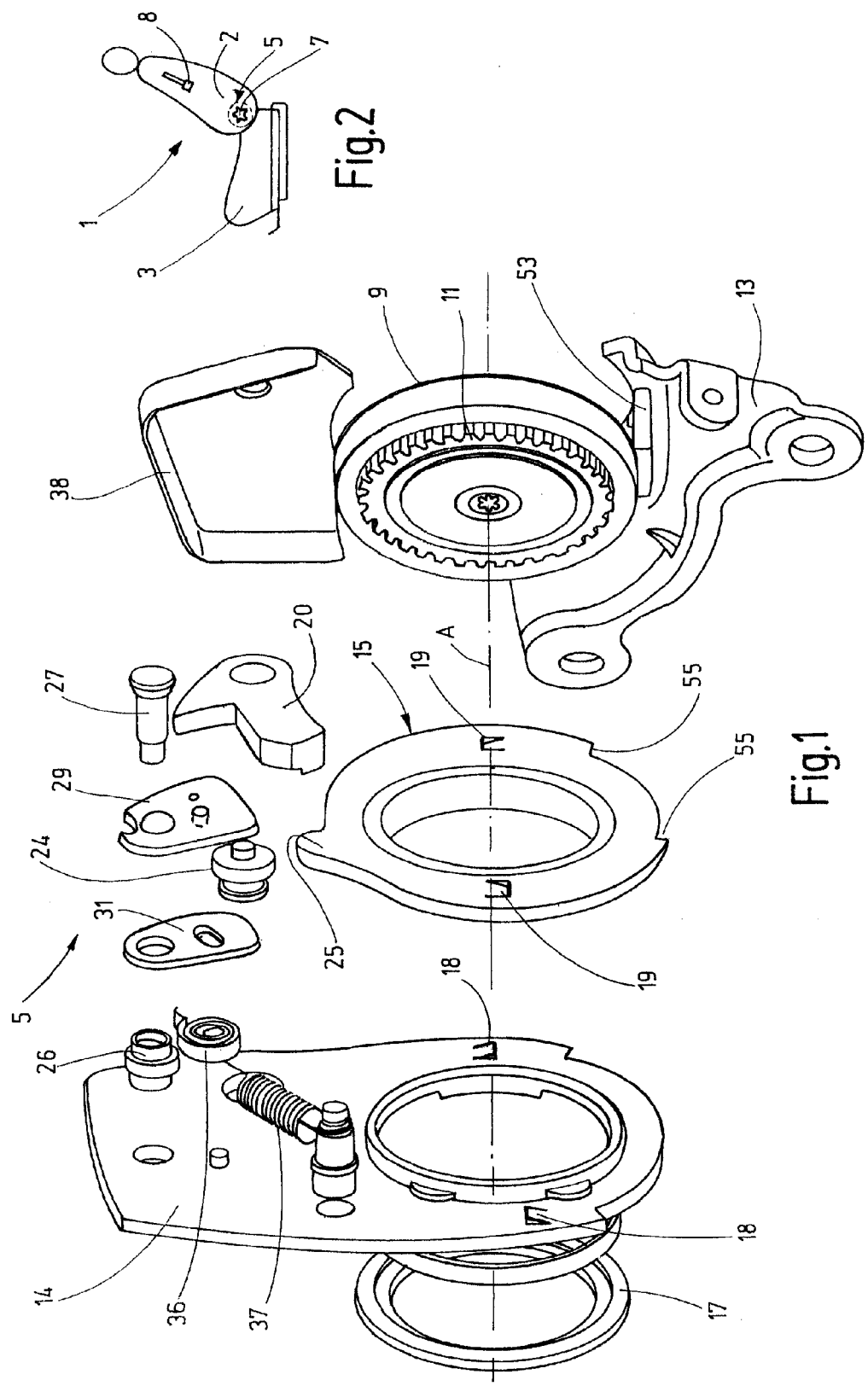

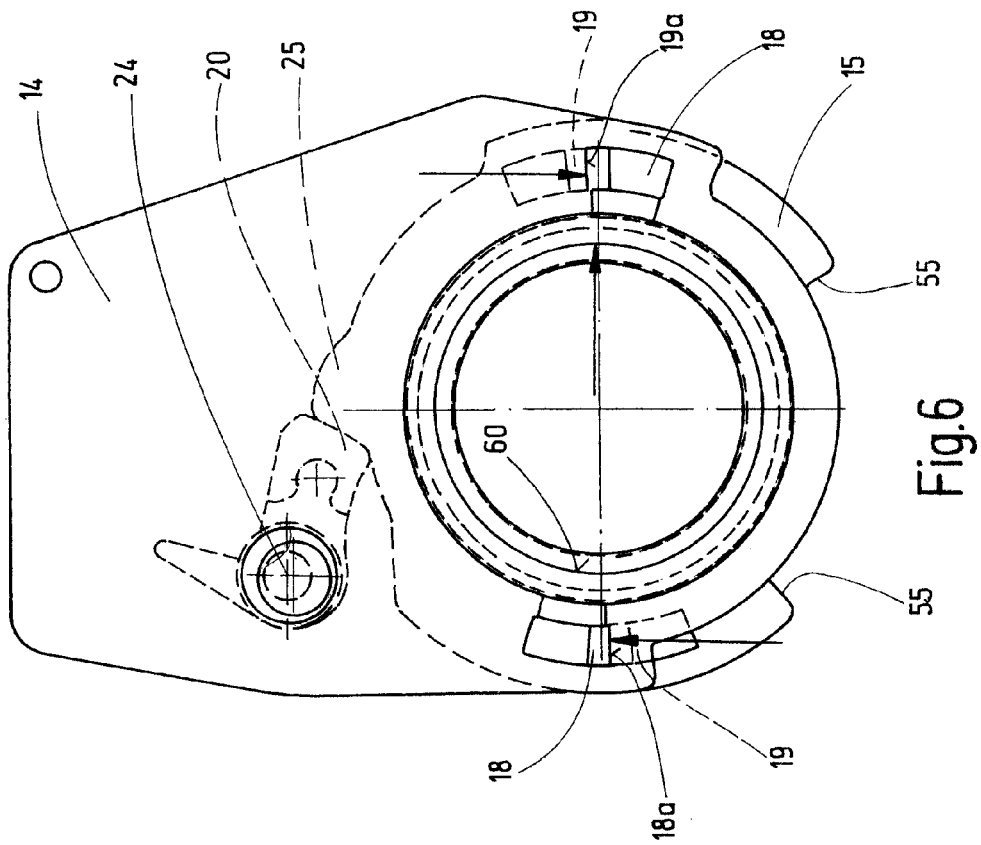
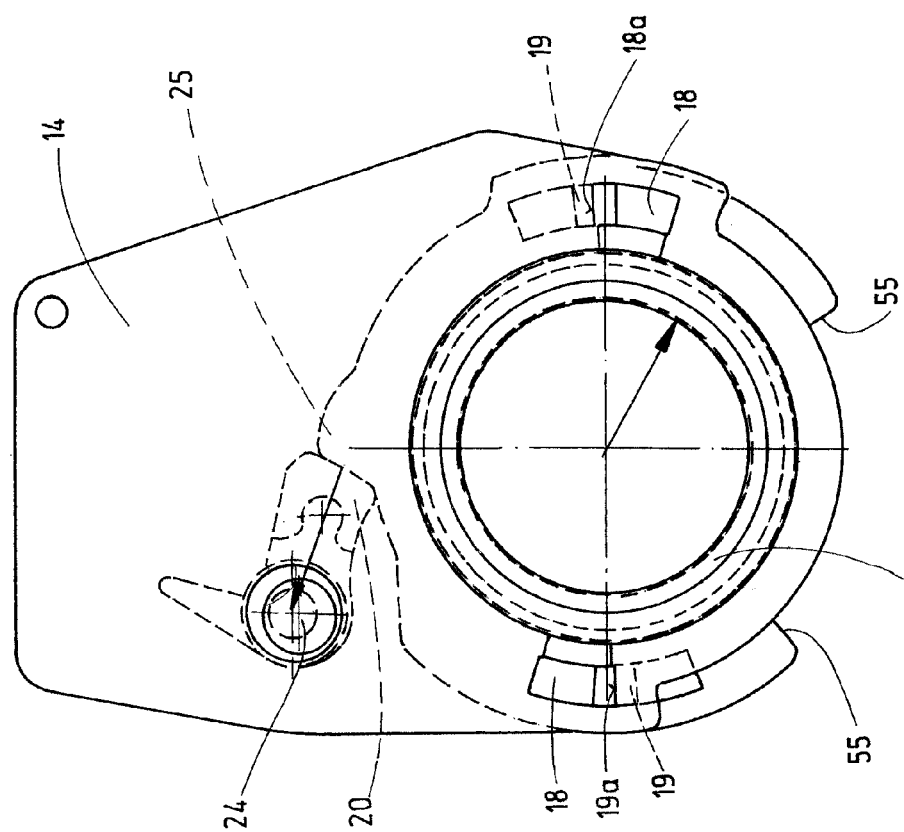

FITTING FOR A VEHICLE SEAT

CROSS REFERENCE TO RELATED APPLICATIONS

This application is a U.S. National Phase application of International Application PCT/EP2009/003062 and claims the benefit of priority under 35 U.S.C. §119 of German Patent Application DE 10 2008 029 438.1 filed Jun. 16, 2008 the entire contents of which are incorporated herein by reference.

FIELD OF THE INVENTION

The invention relates to a fitting for a vehicle seat, particularly for a motor vehicle seat, having a first fitting part fixed to a seat part, a second fitting part, that may be rotated between a plurality of usage positions relative to the first fitting part for setting the inclination of the backrest of the vehicle seat, a detent element which is fixedly connected particularly to the second fitting part, a third fitting part fixed to the backrest, lockable with the detent element, and pivotable about an axis relative to the second fitting part for the free pivoting of the backrest, and a stop for limiting the pivoting motion of the third fitting part on one side.

BACKGROUND OF THE INVENTION

A fitting of this type for a vehicle seat of a two-door motor vehicle is disclosed in DE 10 2006 044 489 A1, which is used to permit access to the rear by freely pivoting the backrest forward and to provide a plurality of variably inclined usage positions of the backrest for the use of the vehicle seat by an occupant. In the usage positions, the third fitting part and the detent element are locked by means of a pawl pivotably mounted on the third fitting part, and which bears with its bearing pin in the rearward pivoting direction against a radially protruding stop and is tensioned in the forward pivoting direction against a detent stop.

SUMMARY OF THE INVENTION

The object of the invention is to improve a fitting of the aforementioned type.

According to the invention, a fitting is provided for a vehicle seat, particularly for a motor vehicle seat. The fitting has a first fitting part fixed to a seat part a second fitting part rotatable between a plurality of usage positions relative to the first fitting part for setting the inclination of a backrest of the vehicle seat, a detent element fixedly connected to the second fitting part and a third fitting part fixed to the backrest. The third fitting part is lockable with the detent element and pivotable about an axis relative to the second fitting part for the free pivoting of the backrest. A stop is provided for limiting the pivoting motion of the third fitting part on one side. The stop includes at least one axially protruding first stop cam formed on the third fitting part and at least one axially protruding second stop cam formed on the detent element.

By axially protruding stop cams being provided as stops, a radial projection of a stop element over an annular contour, particularly of the detent element, is avoided. This reduces the risk of injury or damage to boarding passengers and loads to be stowed, which could arise with a radially protruding stop and freely pivoted backrest. A transfer into a table position is equivalent to the motion of free pivoting. The production of the stop cams is simple if they are pushed out at an angle from the material of the third fitting part and the detent element, for example in the form of tongues. A plurality of stop cams may be provided in each case, which are distributed in pairs in the peripheral direction. Greater distances are produced between the contact points in the locked state when the backrest is loaded, the bearing force in any event changing very little with a change in direction of the loading, and thus noise production caused by bearing play is avoided. The bearing play may be eliminated by a resilient element.

The locking of the third fitting part and detent element preferably takes place by means of a movable pawl, which in the normal case is preferably positioned without play by a clamping element and in the event of a crash is preferably supported by a catch element. By means of an unlocking shaft, the rotation thereof about its own axis unlocking the pawl, a relatively dirt-free space is provided inside the fitting in a simple manner. When unlocked, the unlocking shaft preferably pivots at least one of these two elements away from the pawl. The other element is preferably coupled in entrainment with free travel, so that it is ultimately also pivoted away from the pawl by the rotating unlocking shaft, so that the pawl is unlocked.

The invention is preferably able to be used in longitudinally adjustable vehicle seats of two-door motor vehicles with centered free pivoting of the backrest, but may also be used for other vehicle seats.

The invention is explained in more detail hereinafter, with reference to an embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an exploded view of the embodiment according to the invention in which the components shown at the far right are shown in a different perspective;

FIG. 2 is a schematic side view of a vehicle seat with a fitting according to the invention;

FIG. 5 is the rear face of the sub-assembly shown in FIG. 3 when loaded in the forward pivoting direction, the supporting and bearing forces being shown by arrows;

FIG. 6 is a view of the rear face of the sub-assembly shown in FIG. 3 when loaded in the rearward pivoting direction, the supporting and bearing forces being shown by arrows.

DESCRIPTION OF THE PREFERRED EMBODIMENTS

Figure 3:
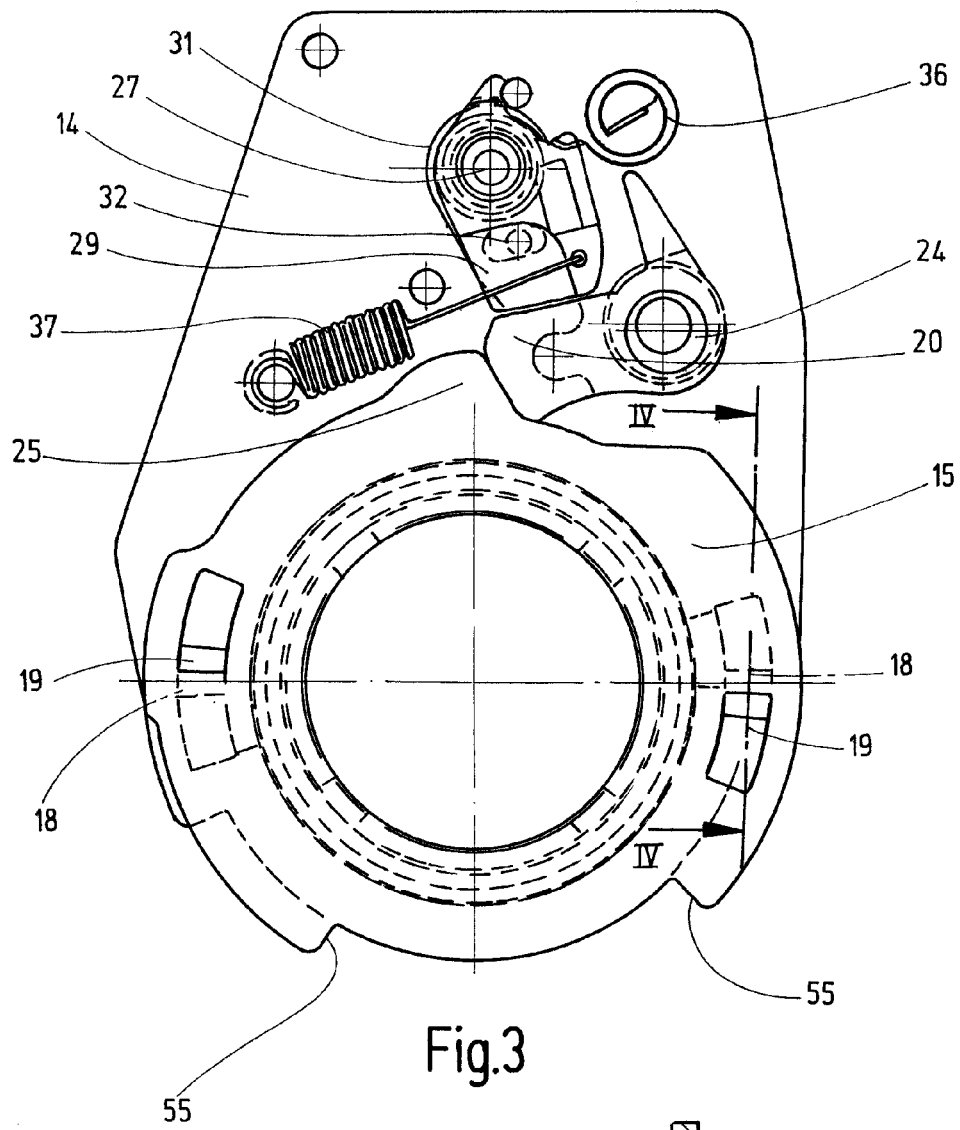
FIG. 3 is a view of the sub-assembly of the embodiment according to the invention relevant for the free pivoting.
Figure 4:
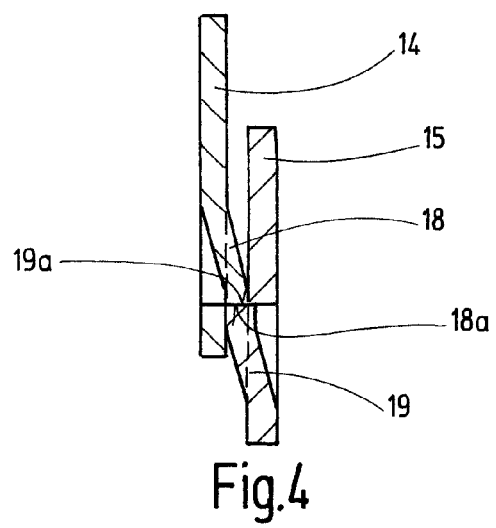
FIG. 4 is a sectional view along the line IV-IV in FIG. 3.
Figure 7:
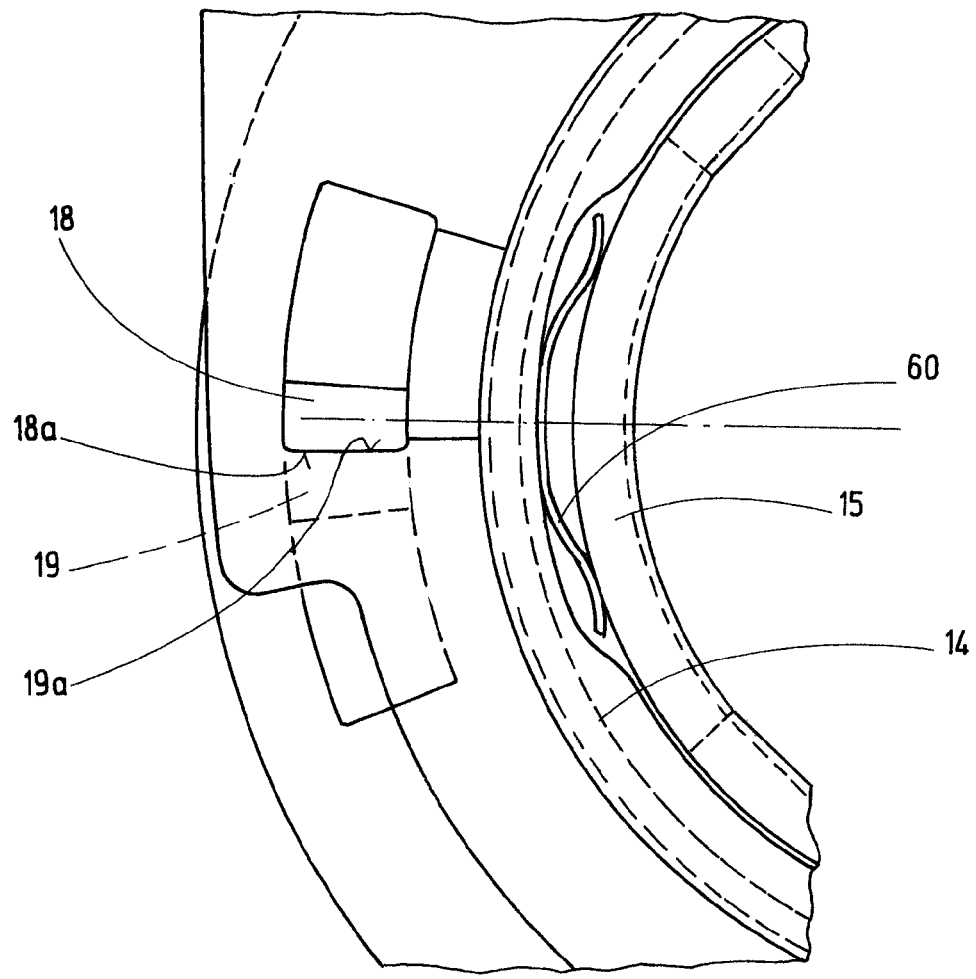
FIG. 7 is a partial view of FIG. 6 with an optional resilient element.

Referring to the drawings in particular, a vehicle seat 1 for a two-door motor vehicle comprises one respective fitting 5 on both sides for the inclination adjustment and the free pivoting of its backrest 2 relative to its seat part 3. On the outside of the vehicle seat 1 a hand wheel 7 is provided on one of the fittings 5 for the inclination adjustment function and a shaft connected to the hand wheel 7 is provided between both fittings 5, whilst for the free pivoting function a hand-operated lever 8 is movably attached to the backrest 2.

The basis of each fitting 5 is a first fitting part 9 and a second fitting part 11, which in terms of construction together form a disk-shaped unit, as is disclosed for example in DE 101 05 282 B4, the disclosure thereof being expressly incorporated herein (and corresponding U.S. Pat. No. 6,799,806 is hereby incorporated herein in its entirety). The two fitting parts 9 and 11 in the embodiment are mechanically interlinked by means of an eccentric epicyclic gear—which is self-locking in the present case—and which in the present case permits a securing of the fitting parts 9 and 11 without play and, for the adjustment, forces a relative rotation of the fitting parts 9 and 11 with a superimposed wobble motion. As a result, a plurality of usage positions are defined, merging steplessly with one another. Such a geared fitting is, for example, disclosed in DE 44 36 101 A1, the disclosure thereof being expressly incorporated herein (and corresponding U.S. Pat. No. 5,634,689 is hereby incorporated herein in its entirety). However, other geared fittings and—in theory—also detent fittings (as, for example, are disclosed in WO 00/44582 A1) may also be used.

The first fitting part 9 is connected to the structure of the seat part 3 ("seat-part-fixed"), by an adapter 13 attached fixedly to the seat part being fastened to the first fitting part 9. Each fitting 5 further comprises a third fitting part 14 which is connected to the backrest structure of the backrest 2 ("backrest-fixed"). The plate-shaped third fitting part 14 is mounted on the second fitting part 11 on the side remote from the first fitting part 9 and able to be pivoted relative to the second fitting part 11 about a central axis A for the central free pivoting, but otherwise locked to the second fitting part 11. The axis A and its position within the vehicle seat 1 define the directional information used in the present case. The free pivoting, which is used for easier access to the next seat row, may at the same time be a transfer into a table position with an approximately horizontal backrest 2, which improves the loading options.

An annular detent element 15 on the second fitting part 11 is used for the pivotable mounting of the third fitting part 14. To this end, the detent element 15 has, for example, a collar, on which the third fitting part 14 with a bearing aperture, which may also be configured in the manner of a collar, is pivotably mounted. The detent element 15 is fixedly connected directly or indirectly to the second fitting part 11, for example by means of a laser weld seam (or in a different manner). An annular fastening disk 17, which engages over the third fitting part 14 in the bearing region, is fixedly connected to the detent element 15 for axially securing said third fitting part and optionally fixedly connected to the second fitting part 11. In the radial direction a certain bearing play is present and in the axial direction the third fitting part 14 and the detent element 15 are spaced apart from one another by up to a material thickness. In the modified embodiment, the third fitting part 14 is mounted on a collar or the like of the fastening disk 17 and the detent element 15 fixedly connected therewith is used for axial securing.

As a stop which is effective in the rearward pivoting direction of the backrest 2 (clockwise in FIG. 3), the third fitting part 18 has at least one, in the present case two, first stop cams 18 diagonally opposite one another relative to the axis A and the detent element 15 has second stop cams 19 of the same number and in a corresponding arrangement. Each first stop cam 18 which has a first stop surface 18a facing in the rearward pivoting direction, cooperates with precisely one second stop cam 19, which has a second stop surface 19a facing in the forward pivoting direction. The stop cams 18 and 19 distributed in pairs in the peripheral direction are arranged radially spaced apart from the axis A, are formed by axial projections in the material facing one another in the form of tongues, and face one another in the peripheral direction with their stop surfaces 18a and 19a located on the front face at the free end of the tongues.

Whilst known stops protrude radially over the outer edge of the associated component, the stop cams 18 and 19 according to the invention only protrude axially, i.e. they are arranged radially inside the outer edge of the associated component. The stop cams 18 and 19 project so that they protrude with their stop surfaces 18a and 19a as far as possible into the intermediate space between the third fitting part 14 and the detent element 15. The projections have the effect that on the respective rear face a recess is produced in the material. The stop surfaces 18a, and 19a extend in the axial and radial direction, i.e. without components in the peripheral direction, so that in the event of contact they may transmit the forces in an optimal manner. The stop formed by the stop cams 18 and 19 limits the pivoting motion of the third fitting part 14 on one side to the rear and namely both in the normal case after the free pivoting and also in the event of a (rear) crash.

A pawl 20 is pivotably mounted by means of a bearing pin 24 on the third fitting part 14 on the side facing the second fitting part 11 (and the detent element 15). For locking and for limiting the pivoting motion of the third fitting part 14 to the front in the event of a (front) crash, in the radial extension of the pawl 20 a detent stop 25 is provided on the detent element 15, preferably molded on. The bearing pin 24 is configured as an eccentric pin, i.e. it is rotatably mounted relative to the third fitting part about an axis in the third fitting part 14 which is offset relative to the pivot axis of the pawl 20. For compensating for production tolerances, the bearing pin 24 is adjusted and fixed such that the pawl 20 bears on the second detent stop 25 with maximum engagement of the pawl without play, but outside the angular range of the self-locking region.

Parallel to the bearing pin 24 in the third fitting part 14 an unlocking shaft 27 is rotatably mounted by means of a bearing bush 26, on which unlocking shaft a catch element 29 is located fixedly in terms of rotation and a clamping element 31 is pivotably located. The catch element 29 and the clamping element 31 are able to be pivoted about the common axis defined by the unlocking shaft 27 and when the third fitting part 14 is locked are aligned with the pawl 20. The mode of operation of the catch element 29 and clamping element 31 is disclosed in DE 44 39 644 A1, the disclosure thereof being expressly incorporated herein (and corresponding U.S. Pat. No. 4,223,947 is hereby incorporated herein in its entirety).

The clamping element 31 bears with a clamping surface curved eccentrically to the unlocking shaft 27 at an angle outside the self-locking region against a bearing surface of the pawl 20. The clamping element 31 is pretensioned by a first spring 36 configured as a spiral spring, so that it acts on the pawl 20 (and clamps said pawl against the detent stop 25). As a result, the third fitting part 14 is locked without play to the detent element 15 and thus to the second fitting part 11. The catch element 29 is acted upon by a second spring 37 configured as a helical tension spring and bears against a stop of the third fitting part 14. In the normal case, i.e. for normal seating use, the pawl 20 is retained by the clamping element 31 in its position, and the catch element 29 is arranged at a short distance from the pawl 20. In the event of a crash, when crash forces act on the pawl 20, the clamping element 31 may open due to the absence of self-locking After a slight pivoting motion of the pawl 20, said pawl comes to bear against the catch element 29. The catch element 29 thus supports the pawl 20, which bears within the self-locking region against the catch element 29, preferably tangentially or concentrically and as flat as possible. Thus it is prevented that the pawl 20 opens (further).

The catch element 29 and the clamping element 31 are coupled to one another in entrainment with free travel by means of a slotted-pin-guide 32. To this end, the clamping element 31 has a slot curved about the unlocking shaft 27, in which a pin of the catch element 29 engages. A cover 38, fastened to the third fitting part 14, covers the pawl 20 along with the bearing pin 24, the catch element 29, the clamping element 31 and the springs 36 and 37, and protects said elements from soiling.

In order to limit the adjusting range during the inclination adjustment, i.e. to limit the relative rotation of the first fitting part 9 and of the second fitting part 11, a locking stop 53 protrudes from the adapter 13 parallel to the axis A, which is received between two limit stops 55 of the detent element 15. By the cooperation with a corresponding limit stop on the third fitting part 14, the locking stop 53 may also limit the free pivoting of the backrest 2, i.e. the pivoting motion of the third fitting part 14 to the front.

On the side of the third fitting part 14 remote from the second fitting part 11, an arm or lever is connected fixedly in terms of rotation to the unlocking shaft 27, to which a cable control is fastened, operatively connected with the hand-operated lever 8. Alternatively, the unlocking shaft 27 may also be actuated by an electrical actuator, for example a servomotor or the like. For unlocking the third fitting part 14 at the start of the free pivoting, the unlocking shaft 27 is rotated about its own axis. The unlocking shaft 27 drives the catch element 29 in order to open it, i.e. it separates and/or moves it away from the pawl 20. In this case, the catch element 29 drives the clamping element 31 by means of the slotted-pin-guide 32, in order to release the pawl 20. The pivoting catch element 29 comes to bear against a—substantially radially protruding—unlocking finger of the pawl 20 and opens said pawl as a result and/or supports said pawl when opened. The pawl 20 is thus completely opened.

If, in the known solutions in which the pawl 20 or the bearing pin 24 cooperate with a further detent cam on the detent element 15, in order to limit the pivoting of the third fitting part 14 in the rearward pivoting direction, the backrest 2 is loaded and the direction of loading changes from the forward pivoting direction to the rearward pivoting direction, the direction of the bearing force changes, as a result, by an angle. This angle corresponds approximately to an angle between the bearing points of the two detent cams on the pawl 20, the bearing pin 24 serving as a vertex. This angle may, therefore, be very large due to the small intervals, i.e. it may be, for example, 90°. The radial play at the bearing point between the third fitting part 14 and the detent element 15 when changing the loading direction permits a small relative movement, producing noise.

In the solution according to the invention, the distances between the bearing point of the detent cam 25 on the pawl 20 and the stop cams 18 and 19 are markedly greater, so that the angle by which the bearing force changes when changing the loading direction, is markedly smaller. In order to prevent the noise-producing relative movement between the third fitting part 14 and the detent element 15 in the bearing point thereof, a resilient element 60, for example a steel spring or a plastics element is preferably provided. This resilient element 60 acting in the radial direction is arranged in the bearing point between the third fitting part 14 and the detent element 15, i.e. preferably between the collar of the detent element 15 and the edge of the bearing aperture of the third fitting part 14. Thus the radial play is eliminated in this bearing point.

While specific embodiments of the invention have been described in detail to illustrate the application of the principles of the invention, it will be understood that the invention may be embodied otherwise without departing from such principles.

The invention claimed is:

1. A fitting for a vehicle seat comprising:
a first fitting part fixed to a seat part;
a second fitting part rotatable between a plurality of usage positions relative to the first fitting part for setting the inclination of a backrest of the vehicle seat;
a detent element fixedly connected to the second fitting part, said detent element having a detent element outer edge;
a third fitting part fixed to the backrest, the third fitting part being lockable with the detent element, and pivotable about an axis relative to the second fitting part for the free pivoting of the backrest, said third fitting part having a third fitting part outer edge; and
a stop for limiting the pivoting motion of the third fitting part on one side, the stop including at least one axially protruding first stop cam formed on the third fitting part and at least one axially protruding second stop cam formed on the detent element, the at least one axially protruding first stop cam and the at least one axially protruding second stop cam cooperating to form the stop to limit the pivoting motion of the third fitting part, the at least one axially protruding first stop cam having a first stop surface protruding into an intermediate space between the third fitting part and the detent element axially spaced apart therefrom and the at least one axially protruding second stop cam having a second stop surface protruding into the intermediate space, said first stop cam being arranged radially inside said third fitting part outer edge, said second stop cam being arranged radially inside said detent element outer edge; and
a pawl wherein for locking the third fitting part to the detent element the pawl is mounted pivotably on the third fitting part via a bearing pin configured as an eccentric pin and said pawl cooperates with a detent cam on the detent element, said bearing pin being adjusted and fixed such that the pawl is locked to the detent element with one or more of maximum engagement of the pawl and without play.

2. The fitting as claimed in claim 1, wherein the first stop surface and the second stop surface face one another in the peripheral direction and bear against one another limiting the pivoting motion of the third fitting part.

3. The fitting as claimed in claim 2, wherein the stop surfaces only extend in the axial and radial direction.

4. The fitting as claimed in claim 2, wherein the first stop surface faces in the rearward pivoting direction and the second stop surface faces in the forward pivoting direction.

5. The fitting as claimed in claim 1, wherein the stop cams are spaced apart from the axis.

6. The fitting as claimed in claim 1, wherein the at least one axially protruding first stop cam comprises two first stop cams arranged diagonally opposite one another relative to the axis, and the at least one axially protruding second stop cam comprises two second stop cams arranged diagonally opposite one another relative to the axis.

7. The fitting as claimed in claim 1, wherein the stop cams of said at least one first stop cam is formed by an axial projection in a material of said third fitting part and said at least second stop cam is formed by an axial projection in a material of said detent element, said axial projection of said third fitting part and said axial projection of said detent element facing one another.

8. The fitting as claimed in claim 7, wherein the stop cams are configured in the form of tongues, and their bearing surfaces are located on a front face at the free end of the tongues.

9. The fitting as claimed in claim 1, further comprising a resilient element, wherein the third fitting part is mounted on the detent element with radial play, and the resilient element is provided radially between the third fitting part and the detent element which eliminates the radial play.

10. The fitting as claimed in claim 1, wherein in the usage positions of the backrest in the normal case, a spring-loaded clamping element acts on the pawl, whereby the third fitting part remains locked.

11. The fitting as claimed in claim 1, wherein in the usage positions of the backrest in the event of a crash, a spring-loaded-catch element supports the pawl, whereby the third fitting part remains locked.

12. The fitting as claimed in claim 11, wherein an unlocking shaft is provided, the rotation thereof about its own axis unlocking the pawl, the catch element and/or the clamping element being coupled to the unlocking shaft in entrainment.

13. A motor vehicle seat fitting comprising:
a first fitting part fixed to a seat part;
a second fitting part rotatable between a plurality of usage positions relative to the first fitting part for setting the inclination of a backrest of the vehicle seat;
a detent element fixedly connected to the second fitting part, said detent element comprising an inner detent element edge and an outer detent element edge;
a third fitting part fixed to the backrest, said third fitting part comprising an inner third fitting part edge and an outer third fitting part edge, the third fitting part being lockable with the detent element and being pivotable about an axis relative to the second fitting part for the free pivoting of the backrest, the third fitting part being axially spaced from the detent element to form an intermediate space between the third fitting part and the detent element;
a first stop cam formed on the third fitting part and having a first stop surface axially protruding into the intermediate space between the third fitting part and the detent element, said first stop cam being located radially between said inner third fitting part edge and said outer third fitting part edge; and
a second stop cam formed on the detent element and having a second stop surface protruding into the intermediate space, the first stop cam and the second stop cam cooperating to limit the pivoting motion of the third fitting part, said second stop cam being located radially between said inner detent element edge and said outer detent element edge, whereby said detent element is pivotable relative to said third fitting part between one position and another position.

14. The fitting as claimed in claim 13, wherein the first stop surface and the second stop surface face one another in the peripheral direction and bear against one another limiting the pivoting motion of the third fitting part.

15. The fitting as claimed in claim 14, wherein the stop surfaces only extend in the axial and radial direction.

16. The fitting as claimed in claim 14, wherein the first stop surface faces in the rearward pivoting direction and the second stop surface faces in the forward pivoting direction.

17. The fitting as claimed in claim 14, further comprising:
a pawl wherein for locking the third fitting part to the detent element the pawl is mounted pivotably on the third fitting part via a bearing pin configured as an eccentric pin and said pawl cooperates with a detent cam on the detent element, said bearing pin being adjusted and fixed such that the pawl is locked to the detent element with one or more of maximum engagement of the pawl and without play, wherein the stop cams are spaced apart from the axis.

18. The fitting as claimed in claim 14, further comprising:
another first stop cam, the another first stop cam being arranged diagonally opposite the first stop cam relative to the axis; and
another second stop cam, the another second stop cam being arranged diagonally opposite the second stop cam relative to the axis.

19. A motor vehicle seat fitting comprising:
a first fitting part fixed to a seat part;
a second fitting part rotatable between a plurality of usage positions relative to the first fitting part for setting the inclination of a backrest of the vehicle seat;
a detent element fixedly connected to the second fitting part, said detent element comprising a detent element side surface located on one side thereof;
a third fitting part fixed to the backrest, the third fitting part being lockable with the detent element and being pivotable about an axis relative to the second fitting part for the free pivoting of the backrest, the third fitting part being axially spaced from the detent element to form an intermediate space between the third fitting part and the detent element, said third fitting part comprising a third fitting part surface located on one side thereof, said third fitting part surface facing in a direction of said detent element side surface, said third fitting part surface defining a first stop cam of said third fitting part, said first stop cam surface and said third fitting part surface extending in an axial direction of said third fitting part with respect to a longitudinal axis of said third fitting part, said first stop surface axially protruding into the intermediate space between the third fitting part and the detent element, at least a portion of said first stop cam being located at a spaced location from an axially extending portion of said third fitting part surface, said detent element side surface defining a second stop cam of said detent element, said second stop cam having a second stop surface, said second stop cam surface and said detent element side surface extending in an axial direction of said detent element with respect to a longitudinal axis of said detent element, said second stop surface axially protruding into said intermediate space, at least a portion of said second stop cam being located at a spaced location from an axially extending portion of said detent element side surface, said first stop cam and said second stop cam cooperating to limit the pivoting motion of the third fitting part wherein said detent element comprises an inner detent element edge and an outer detent element edge, said third fitting part comprises an inner third fitting part edge and an outer third fitting part edge, said first stop cam being located radially between said inner third fitting part edge and said outer third fitting part edge, said second stop cam being located radially between said inner detent element edge and said outer detent element edge, at least a portion of said detent element engaging said third fitting part.

* * * * *